(12) United States Patent
Frigeri et al.

(10) Patent No.: US 10,196,219 B2
(45) Date of Patent: Feb. 5, 2019

(54) DETECTION DEVICE AND METHOD FOR A LAYER TRANSFER DEVICE

(71) Applicant: GEBO PACKAGING SOLUTIONS ITALY SRL, Parma (IT)

(72) Inventors: Mauro Frigeri, Parma (IT); Massimiliano Legati, Parma (IT)

(73) Assignee: GEBO PACKAGING SOLUTIONS ITALY SRL, Parma (IT)

( * ) Notice: Subject to any disclaimer, the term of this patent is extended or adjusted under 35 U.S.C. 154(b) by 0 days.

(21) Appl. No.: 15/529,533

(22) PCT Filed: Nov. 24, 2015

(86) PCT No.: PCT/EP2015/077547
§ 371 (c)(1),
(2) Date: May 25, 2017

(87) PCT Pub. No.: WO2016/083402
PCT Pub. Date: Jun. 2, 2016

(65) Prior Publication Data
US 2017/0305690 A1    Oct. 26, 2017

(30) Foreign Application Priority Data

Nov. 28, 2014    (EP) .................................. 14195366

(51) Int. Cl.
*B65G 47/52* (2006.01)
*B65G 57/24* (2006.01)
(Continued)

(52) U.S. Cl.
CPC ............ *B65G 57/24* (2013.01); *B65G 59/02* (2013.01); *B65G 61/00* (2013.01); *B65G 2203/044* (2013.01); *G01B 11/02* (2013.01)

(58) Field of Classification Search
CPC ........ B65G 57/24; B65G 57/06; B65G 57/02; B65G 57/035; B65G 57/245; B65G 57/03;
(Continued)

(56) References Cited

U.S. PATENT DOCUMENTS 3,696,945 A * 10/1972 Bobolts .................. B65G 57/08
414/790.7
4,205,934 A *  6/1980 Pantin .................... B65G 57/06
414/793.5
(Continued)

FOREIGN PATENT DOCUMENTS

DE    195 15 998 A1    11/1996
EP      2 112 097 A1    10/2009
(Continued)

OTHER PUBLICATIONS

Jul. 24, 2017, EP communication issued for related EP application No. 14195366.1.
(Continued)

*Primary Examiner* — Gregory W Adams
(74) *Attorney, Agent, or Firm* — Young & Thompson

(57) ABSTRACT

Disclosed is a transfer device for transferring preformed layers of products between an external conveyor and a pallet on which layers can form a stack, the transfer device including a support structure including at least one vertical guide column, a tray, mounted on the at least one guide column and receiving the pre-formed layer, a tool, mounted on the support structure, for transferring a layer between the tray and the pallet or the stack. This transfer device includes an object detector with a wide detection angle, for detecting products at the same vertical level in a wide horizontal field (Continued)

of observation, the detector being movable in the vertical direction along the support structure. Also disclosed is a corresponding method.

20 Claims, 6 Drawing Sheets

(51) Int. Cl.
*G01B 11/02* (2006.01)
*B65G 59/02* (2006.01)
*B65G 61/00* (2006.01)

(58) Field of Classification Search
CPC ............ B65G 65/02; B65G 2201/0267; B65G 2207/14; B65G 2814/0305; B65G 2814/0313
See application file for complete search history.

(56) References Cited

U.S. PATENT DOCUMENTS

| | | | | |
|---|---|---|---|---|
| 4,274,780 A | | 6/1981 | Kaul et al. | |
| 5,175,692 A | * | 12/1992 | Mazouz | B65G 61/00 414/900 |
| 5,683,222 A | * | 11/1997 | Ingelhag | B65G 59/023 414/797.2 |
| 5,716,189 A | * | 2/1998 | Winski | B65G 47/086 414/799 |
| 6,231,298 B1 | * | 5/2001 | Heston | B65G 57/06 198/468.2 |
| 6,371,720 B1 | * | 4/2002 | Ouellette | B65G 57/005 414/791.6 |
| 6,827,545 B2 | * | 12/2004 | Ward | B65G 17/24 414/790.9 |
| 7,090,133 B2 | * | 8/2006 | Zhu | G02B 26/10 235/462.01 |
| 7,850,415 B2 | * | 12/2010 | Blanc | B65G 57/24 414/791.1 |
| 8,248,620 B2 | * | 8/2012 | Wicks | G01B 11/002 340/568.1 |
| 2003/0231317 A1 | * | 12/2003 | Sepulveda Carlos | G01K 1/16 356/614 |
| 2012/0274466 A1 | * | 11/2012 | Mezger | G08B 13/183 340/557 |
| 2013/0160403 A1 | * | 6/2013 | Petrovic | B65G 57/24 53/447 |
| 2013/0209213 A1 | * | 8/2013 | Roth | B65G 57/00 414/788.9 |
| 2014/0166866 A1 | * | 6/2014 | Gehring | G01S 17/42 250/234 |

FOREIGN PATENT DOCUMENTS

| | | | |
|---|---|---|---|
| EP | 2 610 197 A1 | 7/2013 | |
| EP | 2805903 A1 | 11/2014 | |
| FR | 2464209 A1 * | 3/1981 | ............ B65B 61/24 |
| JP | S58 139926 A | 8/1983 | |
| WO | WO-0071451 A1 * | 11/2000 | ........... B65G 57/005 |

OTHER PUBLICATIONS

International Search Report, dated Mar. 29, 2016, from corresponding PCT application.

* cited by examiner

DETECTION DEVICE AND METHOD FOR A LAYER TRANSFER DEVICE

BACKGROUND OF THE INVENTION

Field of the Invention

The current invention belongs to the domain of industrial handling of layers of products, to be either stacked in a pile on a support like a pallet, or taken from such a stack.

The object of the present invention is a transfer device, for transferring layers between a stack and an external conveyor, and a corresponding method.

Description of the Related Art

Different technologies of layers handling currently exist. For example, U.S. Pat. No. 4,274,780 discloses an installation in which the products arrive in a single column in order to build the layer. A forklift is then moved up or down to bring the layer at the correct height on the stack.

EP2112097 discloses a combination of a conveyor and a pusher to move the layer on a release tool. Said release tool can then move to bring the layer on the top of the stack. The layer is released on the stack by retracting the bottom layer of the release tool.

EP2610197 discloses a layer handling device with a single column, on which both a release tool and a tray move in the vertical direction.

In any of these architectures, a lot of controls are performed to monitor the working process, in either the palletisation way, or the depalletization way, among which: detecting the stack to depalletize, measuring the thickness of the pallet on which the layers will be stacked, measuring the real height of a stack, even while processing, detecting fallen objects, etc.

It is a normal practice to implement one separate sensor dedicated to each detection, mainly because each detection has its own area. This obviously leads to a high number of detectors. Furthermore, in some embodiments, a sensor has both an emitter and a distant receiver, and is made to detect a presence between them. Using such a principle of detection has a high impact on the design of the machine, because both an emitter and a receiver have to be mounted around each surface to look at.

BRIEF SUMMARY OF THE INVENTION

Therefore, the invention aims at proposing a new way to perform detection controls of a working process for handling layers of products between two stations.

In order to reach this, the invention proposes to implement an object detector, mobile in the vertical direction, having a wide detection angle in the horizontal plane, and a limited detection angle in the vertical direction.

According to the invention, there is provided a transfer device for transferring pre-formed layers of products between an external conveyor and a pallet on which layers form a stack, said transfer device comprising a support structure comprising at least one vertical guide column, a tray, mounted on the support structure and receiving the pre-formed layer, a tool, mounted on the support structure, for transferring a layer between the tray and the pallet or the stack.

This transfer device is characterized in that it comprises an object detector with a wide detection angle, for detecting products at the same vertical level in a wide horizontal field of observation, said detector being movable in the vertical direction along the support structure.

There is also provided a corresponding method for using this device: a transfer method for transferring pre-formed layers of products between an external conveyor and a pallet on which layers can be put one above the other to form a stack, said method comprising transferring a layer between a tray and the stack or pallet and transferring a layer between the tray and an external conveyor, said transfer method comprising detecting objects with an object detector, and moving said object detector in a vertical direction.

BRIEF DESCRIPTION OF THE DRAWINGS

Further features and advantages of the present invention will be better understood from the description of preferred embodiments, which is given below by way of a non-limiting illustration, with reference to the accompanying drawings, in which.

DETAILED DESCRIPTION OF THE PREFERRED EMBODIMENTS

Figure 1:
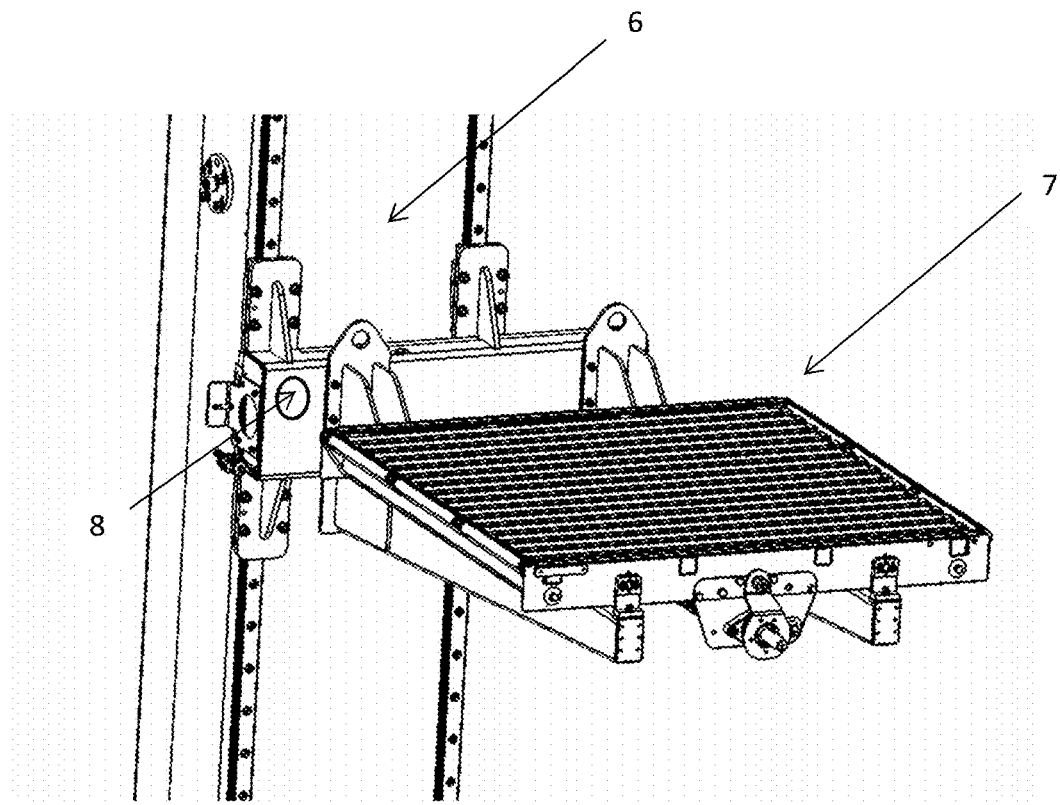
FIG. 1 shows a possible location of the object detector on the tray.

A first object of the present invention is a transfer device 1 for transferring pre-formed layers 2 of products between an external conveyor 3 and a pallet 4 on which layers 2 form a stack 5, said transfer device 1 comprising a support structure comprising at least one vertical guide column 6, a tray 7, mounted on the support structure and receiving the pre-formed layer 2, a tool, mounted on the support structure, for transferring a layer 2 between the tray 7 and the pallet 4 or the stack 5, like a gripping head 11 for gripping a layer 2 and transferring it from the pallet 4 or stack 5 to the tray 7 or a release tool 12 for releasing a layer 2 received from the tray 7 on the top of the pallet 4 or stack 5. Preferably, the tray 7 is movable in the vertical direction, in order to reduce the cycle time. The tray 7 then moves up and down between the top level of the stack 5 and the external conveyor 3, while the tool mainly moves in the horizontal direction between the stack 5 and the tray 7.

For embodiments having a fixed tray 7, said tray 7 is normally at the height of the external conveyor 3, and the tool moves up and down between the top level of the stack 5 and the tray 7.

The tray 7 and the external conveyor 3 can be aligned are installed side by side.

Products can packs, boxes, full or empty, individual containers, plastic crates, etc. The successive layers 2 can have different shapes, mainly for stability purposes.

According to the present invention, the transfer device 1 comprises an object detector 8 with a wide detection angle, for detecting products at the same vertical level in a wide horizontal field of observation, said detector being movable in the vertical direction along the support structure.

The object detector 8 is preferably movable along the guide column 6 in the vertical direction, up and down, in a controled way. A possible detection zone 13 of said object detector 8 is shown in top view in FIG. 4, and front view in FIG. 5. The detection zone 13 of such an object detector 8 mainly consists in a horizontal surface, or a corresponding volume of small thickness, compared to the thickness of a layer 2.

Figure 4:
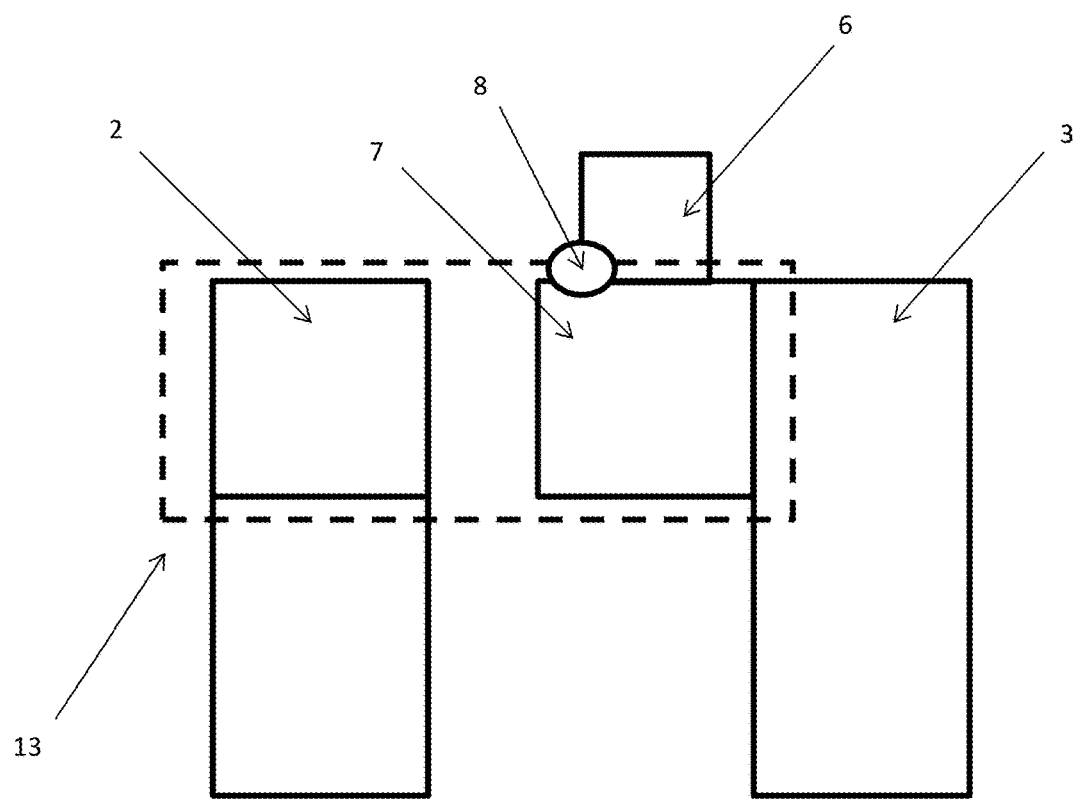
FIG. 4 is a top view of an installation.
Figure 5:
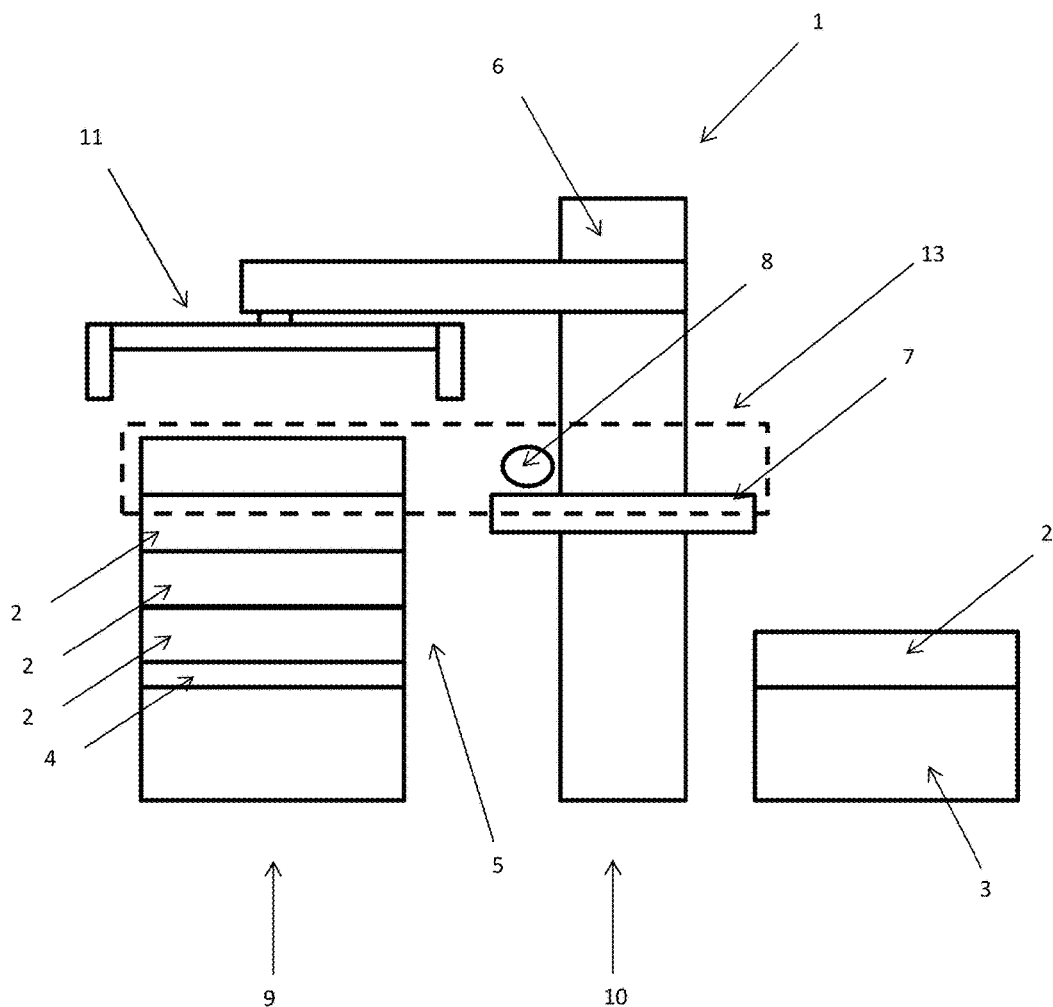
FIG. 5 is a front view of the installation with a gripping tool.
Figure 6:
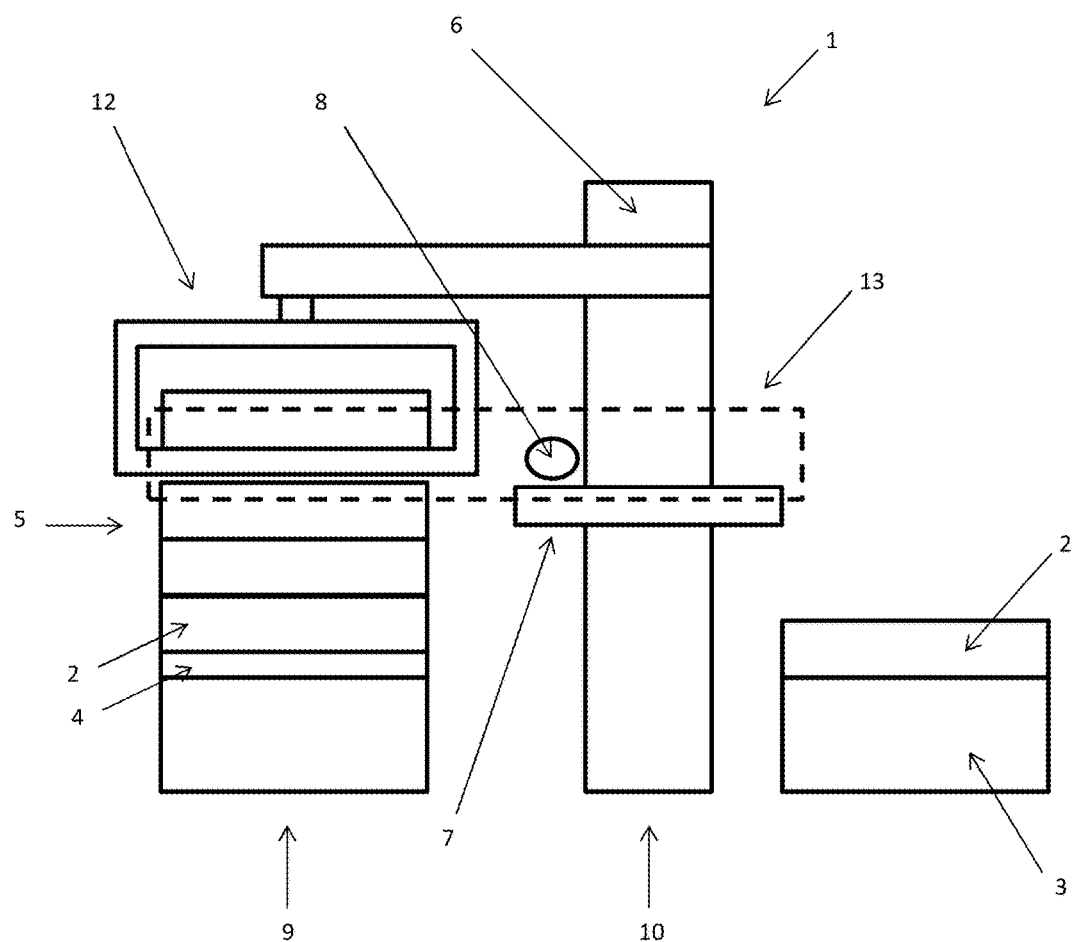
FIG. 6 shows a front view of the installation with a release tool.

The object detector 8 is able to detect objects which are approximately at its own vertical level, as the thickness of the detection zone 13 is limited. FIGS. 4 and 5 show that the detection zone 13 extends in a transversal direction in both the pallet zone 9 and the tray zone 10. The pallet zone 9 is mainly defined by the volume occupied by at least a pallet 4 and a complete stack 5. The pallet 4 is therefore mainly the bottom surface of the pallet zone 9. The tray zone 10 is mainly defined by the horizontal dimensions of the tray 7 and by its vertical movement. For embodiments having a tray 7 moving in the vertical direction, the bottom of the tray zone 10 mainly consists in the tray 7 at its bottom position, and the top of the tray zone 10 mainly consists in the tray 7 at its top position. The layers 2 are stacked in the pallet zone 9 and the tray 7 evolves in the tray zone 10. From a general standpoint, the tray zone 10 is a volume extending from the tray 7 in the vertical direction, up and down.

The detection angle of the object detector 8 is preferably wide enough to allow detection in both the tray zone 10 and the pallet zone 9. The detection zone 13 does not need to be thick in the vertical dimension. Ideally, this detection zone 13 is thin enough to have a precise value of the height of an object detected by the object detector 8.

According to an additional possible feature, the detector 8 is positioned so as to be able to detect objects in the pallet zone 9, of which the pallet 4 mainly defines the bottom limit. This will make it possible to use the object detector 8 to identify problems in the process, occurring when an object, like a product, is located in the pallet zone 9 at an unexpected vertical position, or even horizontal position. The detection zone 13 thereby intersects the pallet zone 9.

According to another possible additional feature, the detector 8 is positioned so as to be able to detect objects in the tray zone 10, said tray zone 10 mainly corresponding to the volume occupied by the tray 7 during its vertical movement. Here again, the ability of the object detector 8 to scan the tray zone 10 is used for specific security checks, detailed hereafter. The detection zone 13 thereby intersects the tray zone 10.

The detection zone 13 of the object detector 8 preferably intersects both the pallet zone 9 and the tray zone 10.

In some possible embodiments, the detector 8 is a laser based surface detector. Such object detector 8 is able to scan the content of a detection zone which has a very small thickness. Also, another advantage of such detectors is that there is no need to have a receiver facing an emitter. The precision of the detection is also an important feature, as this detector can possibly be used to identify the exact horizontal location of a layer 2, as will be described later on.

FIG. 1 shows a possible additional feature, according to which the detector 8 is fixed to the tray 7 itself, preferably at the level of its own support structure, and oriented so as to be able to detect objects on the top surface of the tray 7, and the object detector 8 is preferably mounted near the pallet zone 9, so as to be able also to detect objects in said pallet zone 9. As seen on this figure, the tray 7 has a horizontal beam, from which a plate extends. The object detector 8 is then preferably located out of the top surface of the tray 7, on which layer 2 is received, in order to avoid any interference in the field of observation. The object detector 8 is preferably located close to the frontier between the pallet zone 9 and the tray zone 10.

In some embodiments, the support structure comprises only one guide column 6, the tray 7 is mounted on said column 6 and defines a tray zone 10, the tool is also mounted on said column 6 with a cantilever beam, defining a pallet zone 9 under its free end, and the object detector 8 is mounted at the level of the interface between the tray zone 10 and the pallet zone 9. Therefore, a first side of the detection zone 13 of the object detector 8 extends in the pallet zone 9, and the other side of the detection zone 13 extends in the tray zone 10. With such an object detector 8 placed between these two zones, an object in one zone does not prevent a correct detection in the other zone.

The present invention also relates to a transfer method for operating the corresponding above described transfer device: a second object of the present invention is a transfer method for transferring pre-formed layers 2 of products between an external conveyor 3 and a pallet 4 on which layers can be put one above the other to form a stack 5, said method comprising transferring a layer 2 between a tray 7 and the stack 5 or pallet 4 and transferring a layer 2 between the tray 7 and an external conveyor 3. It must be understood that the stack 5 can comprise only one layer 2, and that the transfer process or transfer device works to transfer also the first layer 2 to the empty pallet 4, or, for the complementary process, to transfer the final layer 2 of the stack 5 from the pallet 4.

This process can be either a palletization process or a depalletization process. For example, the external conveyor 3 can work as an output conveyor for a depalletization process or as an input conveyor for a palletization process.

Transferring the layer from the tray 7 is preferably done with a gripping head 11 movable in the horizontal direction between the pallet zone 9 and the tray zone 10 and also vertically movable to lift the layer 2 from the stack 5 and bring it down to the tray 7, or even with a release tool 12 movable in the vertical direction and having a bottom layer which can be retracted to release the layer 2 on the top of the stack 5. For a palletization process, transferring the layer from the tray 7 to the stack 5 also needs an actuator able to move the layer 2 from the tray 7 to the release tool 12.

Transferring the layer 2 between the external conveyor 3 and the tray 7 can be done with an actuator mounted on said tray 7, for example a moving belt, or even with a pusher, mounted on the tray 7 or fixed and linked to the external conveyor 3.

According to the present invention, the transfer method comprises detecting objects with an object detector 8, and moving said object detector 8 in a vertical direction, so that it can detect objects in the pallet zone 9 or objects in the tray zone 10, said detector 8 mainly achieving a lateral detection, mainly in a horizontal plane, being able to detect objects at its own vertical level. The height of the object detector 8 is preferably controlled at any time.

As will be further described later on, a depalletisation process mainly consists in transferring a layer 2 from the pallet zone 9 to the tray 7 in the tray zone 10, and then from the tray 7 to the external conveyor 3. When the top layer 2 is lifted from the stack 5, it is important to check that no other objects of the underneath layer has been pulled up and is therefore hanging under the transferred layer 2. Therefore, according to another possible additional feature, the transfer method comprises detecting an object hanging under the layer 2 gripped and lifted for the transfer, before said layer 2 is released on the tray 7, said detection mainly consisting in vertically positioning an object detector 8 at the level of the height of the top layer 2 on the stack 5 before it is lifted, said object detector 8 being positioned to detect products in the pallet zone 9, and further receiving and treating the signal of said object detector 8. After the top layer 2 has been lifted, no object should be detected at its previous height. If the object detector 8 detects something, an alarm or other special behavior can be triggered.

According to another possible feature, the transfer method comprises detecting the height of the stack 5, said detection mainly consisting in moving the or an object detector 8 in the vertical direction along the stack 5, preferably by moving up the or an object detector 8 at a certain speed while the stack 5 is detected, and then, when the detector 8 has arrived at a higher position than the top of the stack 5 and that no product is detected anymore, moving it down at a slower speed until the stack 5 is detected again. As the vertical position of the object detector 8 is monitored during its movement, the end of detecting an object corresponds to the top of the stack 5. The height of the stack 5 mainly corresponds to the vertical position of the top surface of the uppermost layer 2 of the stack 5 on the pallet 4.

Measuring the height of the stack 5 is necessary for both a depalletizing process and a palletizing process, and can be performed at the beginning of a depalletisation cycle, after a stop in a layer 2 palletization cycle, after a stop in a layer 2 depalletisation cycle, or even during the layer 2 palletization or depalletisation cycle. In any case, it is preferable to take advantage of the existing vertical movement of tray 7 during the cycle to do this measurement.

According to another possible additional feature of such a transfer method used as a depalletisation method, it comprises detecting the presence of a new full pallet 4 and stack 5 to be treated by depalletization, said detection mainly consisting in vertically positioning the or an object detector 8 at the expected height of the bottom layer 2 of a stack 5 and further receiving and treating the signal of said object detector 8 when the pallet 4 has reached the adequate position under the gripping head 11. The pallet 4 full of layers 2 arrives under the tool thanks to a standard pallet conveyor. It is necessary to reduce the speed of this pallet conveyor at the end of the movement. Once it has arrived at the expected position, it is still necessary to verify that there is a stack 5 on the pallet 4, which is done by checking the presence of at least one layer 2 in the stack 5. It is then also possible to have a precise detection of the end movement of the pallet 4 and to stop it at the expected position with a higher precision. As understood, the object detector 8 is moved to a height corresponding to the normal location of the bottom layer 2 of the stack 5.

In a depalletisation process, a gripping head 11 is lowered to the uppermost layer 2 of the stack 5. Such a gripping head 11 mainly works for example as a clamp, and it is therefore necessary to ensure a correct position of the gripping head 11 before actuating it. Then, according to another possible feature in a depalletisation method, the transfer method also comprises detecting the exact horizontal position of the layer 2 to be gripped and transferred to the tray 7, said detection mainly consisting in vertically positioning the or an object detector 8 at the height of said layer 2, and further receiving and treating the signal of said object detector 8, preferably by positioning the gripping head 11 according to the horizontal position detected.

In a palletization method, it is necessary to ensure that the tray 7 is empty to receive a new layer 2 to palletize. This control check has to be performed after the layer 2 has been transferred to the tool, and before a new layer 2 is transferred from the external conveyor 3. The same check has to be performed in a depalletization process: controlling that the receiving surface of the tray 7 is free to receive a new layer 2 from the tool. This check has to be done after the layer 2 has been transferred from the tray 7 to the external conveyor 3, and before a new layer 2 is release by the tool on the tray 7. Therefore, according to a possible additional feature, the method comprises detecting that the tray 7 is empty after the transfer of the layer 2 from the tray 7, to either the external conveyor 3 or the tool, said detection mainly consisting in vertically positioning the or an object detector 8 at the height of the receiving surface of the tray 7 and further receiving and treating the signal of said object detector 8.

In a palletization process, it is necessary, at the beginning of the cycle, to detect the real thickness of the pallet 4. This is preferably done in the same way than when the total height of the stack 5 is measured, as described above: in some embodiments, the transfer method comprises detecting the thickness of an empty pallet 4 before layers 2 are stacked on it, said detection mainly consisting in vertically moving the or an object detector 8 oriented in the direction of the pallet 4. As the object detector 8 has a vertical and controled movement along the pallet 4, the detection is directly used for identifying the thickness.

As described above, a lot of controls in the transfer method, working either as a palletisation or as a depalletisation, are achieved by an object detector 8 able to move in the vertical direction in the support structure, or at least to be put at a predefined vertical level. In addition, for some controls, the object detector 8 has to be able to detect objects in the pallet zone 9, and, for some other controls, it has to be able to detect objects in the tray zone 10, especially on the receiving surface of the tray 7. The object detector 8 preferably only has a thin detection zone 13, in the vertical direction. This makes it possible to have a precise screening of both the pallet zone 9 and the tray zone 10, as the position of the object detector 8 is always precisely monitored and controled.

Preferably, according to another possible additional feature, the detections are achieved with the same object detector 8: only one object detector 8 is used for every detection.

Finally, in order to avoid increasing the cycle time but also to reduce the number of actuators, the object detector 8 can directly benefit from the vertical movement of the tray 7. By fixing the object detector 8 on the tray 7, it is moved up and down while the tray 7 moves for the purpose of transferring the layers 2. Furthermore, by fixing the object detector 7 so that it can scan the top surface of the tray 7, said object detector 7 is constantly able to detect objects on the receiving surface of the tray 7, when necessary.

In the embodiment shown in the attached drawings, the transfer device 1 has one single guide column 6 which is vertical and works as a support for the main components of said device. The tray 7 is mounted on said single column 6 and can move vertically between the vertical level of the external conveyor 3 and the vertical level of the top of the stack 5. The transfer device 1 also has means to move a layer 2 which is on the tray 7 and to slide it on the external conveyor 3. Such a means can be a pushing transversal bar. Preferably, the top surface of the tray 7 is movable and the tray 7 can work as a conveyor to drive the layer 2 out of it until it arrives on the external conveyor 3. The main function of the tray 7 is to arrange the vertical displacement of the layer 2, between the top of the stack 5 and the external conveyor 3.

The transfer device 1 also has a tool to shift a layer 2 between the stack 5 and the tray 7. On the attached drawing, this tool mainly comprises a horizontal cantilever beam, extending from the guide column 6 to the pallet zone 9, and a gripping head 11 for gripping a layer 2. The gripping head 11 is slidably mounted on this cantilever beam, and can therefore slide between the pallet zone 9 and the tray zone 10. The cantilever beam is slidably mounted on the guide column 6 and can move vertically so that the gripping head 11 can always be brought at the good height at the top of the stack 5, either to catch the layer 2 or to release it.

As shown in FIG. 4, the working configuration has three main zones, side by side: the zone of the pallet 4, the zone of the tray 7, and the zone of the external conveyor 3.

The pallet zone 9 extends vertically from the pallet 4. The tray zone 10 is mainly defined by the volume occupied by the tray 7 during its vertical movement. The horizontal displacement of the layer 2 between the pallet zone and the tray zone is achieved by the tool, while the horizontal displacement of the layer 2 between the tray zone 10 and the external conveyor 3 is achieved by other means described earlier.

The transfer device 1 also has an object detector 8, which can be moved vertically. This detector 8 is preferably mounted so as to be able to detect products in the tray zone as well as products in the pallet zone 9. The detector 8 is preferably mounted so that a product in one of these two zones does not prevent the detection of a product in the other zone. The object detector 8 is also preferably slidably mounted on the guide column 6. From a general stand point the vertical position of the object detector 8 is always monitored, by any appropriate means of the transfer device 1, so that the exact vertical position of the object detector 8 is always known, even while it is moving.

The vertical movement of the object detector 8 can be created by a dedicated actuator, so that the movement and the position of said detector can be controlled independently. In such embodiments, the transfer device 1 has an actuator for moving the product sensor 8 up and down, and the product sensor 8 is directly mounted on the support structure, at the level of guiding slides.

In other embodiments, the object detector 8 is directly fixed to the tray 7, for example at the level of the supporting beam. The object detector 8 is then preferably mounted at the top surface of the tray 7, and preferably at the side of said tray 7 near the pallet zone 9. The object detector 8 is then able to detect products on the top surface of the tray 7, but also to detect products in the pallet zone 9.

The object detector 8 is such that it can detect products located at its own height, with a wide field of view in the horizontal direction. The detection angle is preferably at least 180 degrees. The detection range of the object detector 8, placed between the pallet zone 9 and the tray zone 10, is therefore large enough to detect products at the same vertical level, located in any of these two zones. As the object detector 8 can move vertically, it can screen both the entire pallet zone and the entire tray zone. The vertical position of the object detector 8 defines the exact zone of observation. The thickness of the observed zone does not have to be high, the object detector 8 can be able to detect only in a horizontal surface.

The object detector 8 can be laser based, and, from a general standpoint, preferably does not need a receiving unit located at the other end of the detection zone. In fact some detection principles need an emitter and a receiver, and can then detect products between them, as they block the transmission. This working principle can be difficult to use when a plurality of areas have to be observed, which is the case in this invention, as will be understood later on. Another disadvantage is of course that the zone opposite to the emitter has to be dedicated to the receiver, and the design of the machine has to be adapted. The object detector 8 is preferably made of a single component grouping both the emitter and the receiver, with an ultrasonic, infrared or laser principle. The emitter and receiver, preferably laser based, are then located in the same place, reducing the impact on the transfer device 1 architecture. This also reduces the risk of having blind zones in the detection range of the object detector 8. It is also preferable to have only one such object detector 8, even for architectures having more than one guide column 6.

The object detector 8 can preferably instantaneously scan a limited angular portion of its complete detection range, said portion moving between the two ends of said complete angular detection range. The complete detection range can be scanned many times in one second, for example 10 to 30 times per second. The time needed for the object detector 8 to scan its detection zone is small enough to avoid stopping the process when a detection has to be performed.

The ability of the object detector 8 to detect a product located at any height in either the pallet zone 9 or the tray zone 10 makes it possible to use this object detector 8 for monitoring the working process of the transfer device 1, as will now be described in further details.

Figure 2:
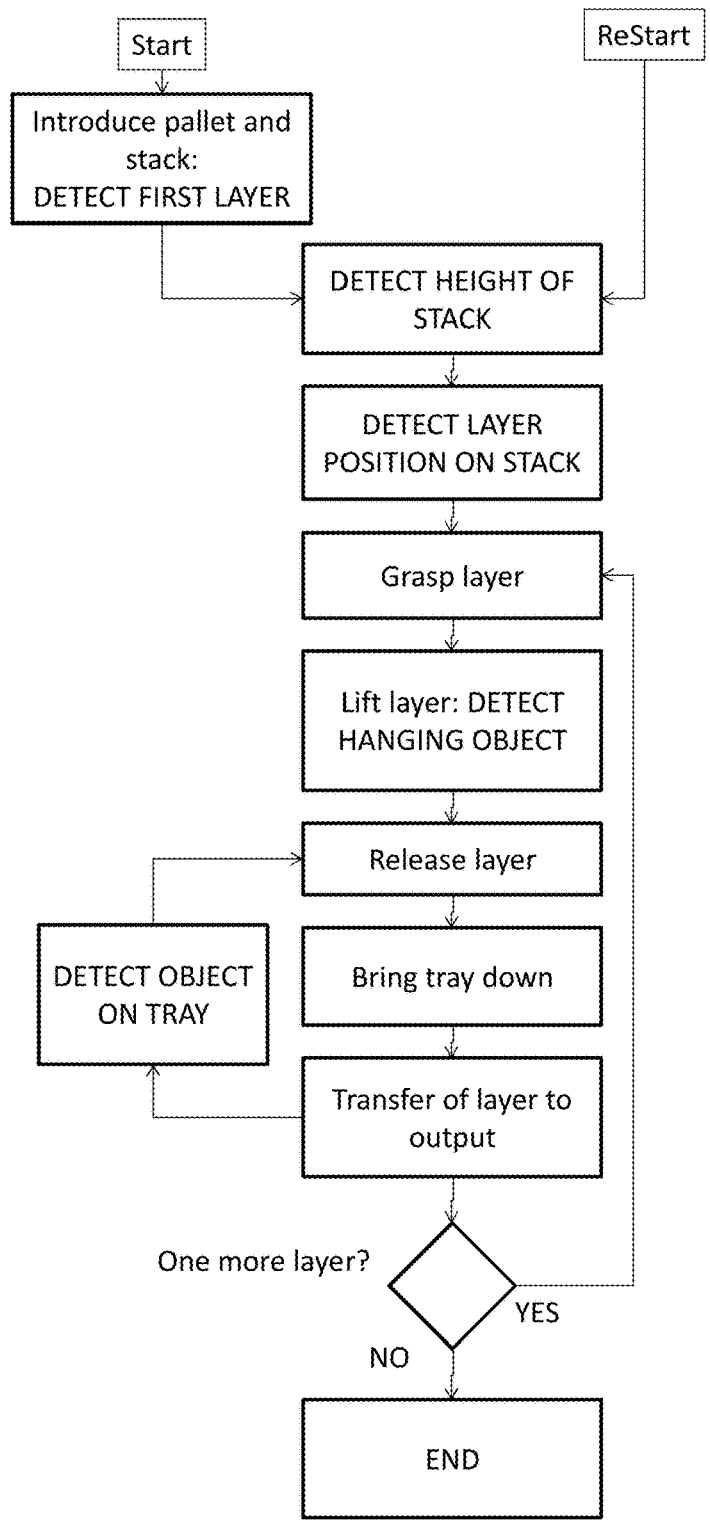
FIG. 2 shows some steps of a depalletisation process.

The working process will first focus on standard steps of a basic depalletising process, see FIG. 2, in which layers 2 are transferred from a pallet 4 to an external conveyor 3. In such a process, a pallet 4 with a stack 5 first arrives at the end of a pallet conveyor and is then stopped. In order to initiate the transfer of the layers 2 to the external conveyor 3, it is then important to be sure that the stack 5 on the pallet 4 comprises at least one layer 2. For this first check, the object detector 8 is put at the vertical level of the expected first layer 2 of the stack 5, which means slightly above the pallet 4 itself. This first detection uses the ability of the object detector 8 to scan the side of the pallet zone 9. If a product is detected in this area, it will be considered that a stack 5 of at least one layer 2 is present in the pallet zone 9, and that the transfer can start. Having the object detector 8 at the correct vertical position for this first check can be achieved easily if said detector is directly mounted on the vertically moving tray 7. It should be noted that in a depalletising process, the tray is normally in its bottom position after a stack 5 has been completely treated, and before treating a new one. Positioning the object detector 8 at the height of the first expected layer 2 might therefore not require a special and dedicated movement of the tray 7.

Once the first bottom layer 2 of the stack 5 has been detected, the height of the stack 5 is measured. For this measurement, the object detector 8 is moved in the vertical direction. First, while the object detector 8 detects products at its own height in the pallet zone 9, it is lifted up in a fast movement. The lifting movement is stopped as soon as no product is detected in this zone anymore, meaning that the object detector 8 is now higher than the stack 5 itself. Second, the object detector 8 slowly goes down until a product is detected again, meaning that the object detector 8 is now at the height of the stack 5. It is clear that the vertical position of the object detector 8 must be precisely monitored at any time of this height detection. At the end of this height measurement, the object detector 8 is at the level of the top of the stack 5. This means that the normal movement of the tray 7 can be used to achieve this detection for embodiments in which the object detector 8 is directly mounted on said tray 7: at the beginning of the transfer process, the tray 7 is in its lowest position, corresponding to the last vertical position needed to transferring a layer 2 to the external conveyor 3. Then the tray 7 has to be brought at the height of the first top layer 2 of the stack 5, as the gripping head 11 is mainly dedicated to a horizontal transfer between the tray 7 and the stack 5. Therefore, when the object detector 8 is mounted on the tray 7, it can benefit from the vertical movement of the tray 7 reaching the top of the stack 5 to detect the exact height of said stack 5. For this second detection function, the detection zone 13 needed covers at least the pallet zone 9.

After having identified the exact height of the stack 5, the gripping head 11 can start its operation and grips a full layer 2 of products. For each layer 2, after the layer 2 has been taken, the gripping head 11 is slightly lifted up, then transversally moved to the tray zone 10, and lowered down so that the layer 2 can be directly released on the tray 7. Therefore, it is important to have a precise detection of the exact horizontal position on the stack 5 for the layer 2 to be picked by the gripping head 11. The exact horizontal position of the layer 2 is then taken into account for positioning the gripping head 11 before it is brought down on said layer 2. This horizontal position of the layer 2 should be understood as the position in the horizontal plan, first parallel to the horizontal movement of the gripping head 11, second, perpendicular to said movement. This detection of the horizontal position of the layer 2 can be directly achieved by positioning the object detector 8 at the same vertical position than the layer itself. The object detector 8 should then be able to detect objects and also their distance. By using for example a laser based detector, it is possible to identify how far from the detector 8 is the detected surface itself. This makes it possible to identify an external surface of the layer 2, and to conclude about the position of the layer 2 in the horizontal plan. It should be noted that if the object detector 8 is mounted directly on the tray 7, said tray 7 is normally already at a vertical position which corresponds approximately to the vertical height of the layer 2 to pick and to which the exact position must be detected. It is therefore not necessary to provide a movement of the object detector 8 dedicated to this step.

Once the exact position of the layer 2 is identified, the gripping head 11 goes down and grasps the layer 2. The gripping head 11 is then lifted. At this stage a product of the underneath layer 2 can remain attached at the bottom of the lifted layer 2. This can happen for example if the products of the layers 2 have corresponding geometric cooperating shapes for vertical stacking, like plastic crates, for example. It can also happen if the products are plastic crates for empty glass bottles, but one bottle is slightly taller than the case it is in. An object can then be lifted and pulled up while lifting the first top layer 2 of the stack 5. This situation can be dangerous for many reasons: the object taken out of the underneath layer can fall down on the floor between the stack 5 and the tray 7. If the gripping head 11 is not lifted high enough, the horizontal movement of the pulled up object can lead to break said object or move part of the underneath layer in the horizontal direction, which could lead to the stack 5 falling down. It is then important to check if nothing is hanging under the lifted layer 2. For this purpose, the object detector 8 is put at the height of the layer 2 before it is lifted and screens the pallet zone 9. At this height, before the gripping head 11 lifts the layer 2, the object detector 8 directly detects the layer 2. After the gripping head 11 has moved to lift the layer 2, nothing should be detected anymore. If something is detected, it means that a problem has occurred and that the process should better be stopped. The ability of the object detector 8 to scan the area above the pallet 4 makes it possible to use it for this security check. Here again, when the object detector 8 is directly mounted on the tray 7, no further movement of the object detector 8 has to be organized. The tray 7, waiting to receive the layer 2 from the gripping head 11, is already at the good position, approximately in front of the layer 2 to be lifted.

After the layer 2 has been grasped and lifted by the gripping head 11, it has to be released on the tray 7. In order to avoid any collision, it is therefore necessary to first ensure that the tray 7 is really empty. It should be noted here that in a depalletisation process, a layer 2 is transferred from the stack 5 or pallet 4 to the tray 7, and then from the tray 7 to the external conveyor 3. A problem in this second transfer step leads therefore to the tray 7 being not completely empty, which leads to collisions when bringing the next layer 2 on the tray 7. Therefore the process has a step in which the top surface of the tray 7 is scanned by the object detector 8, in order to check whether or not is can accept a complete new layer 2 of products. This screening of the top surface of the tray 7 can be done at any time between the end of the transfer of the layer 2 from the tray 7 to the external conveyor 3, and the transfer of the next layer 2 from the stack 5 to the tray 7. For this, it is proposed to put the object detector 8 at a height making it possible to observe the top surface of the tray 7, on which the ayers 2 are received. As the tray 7 moves vertically, the object detector 8 can be fixed and the tray 7 simply stopped when it arrives at the corresponding vertical position. In some embodiments, the object detector 8 is directly fixed to the moving tray 7 and positioned to as to be able to detect objects at the top surface thereof. One of the advantages of this configuration is that observing the top surface of the tray 7 can be done simultaneously while performing other steps, like, for example, lifting the tray 7 from the position of the external conveyor 3 to the top of the stack 5, or while waiting for the layer 2 to be released on the tray 7 by the gripping head 11. If the object detector 8 is mounted on the tray 7, it is always at the good position to detect if the top surface is really free.

Once the layer 2 has been transferred to the top surface of the tray 7, said tray 7 is brought down at the vertical level of the external conveyor 3 for a horizontal transfer of the layer 2 to said external conveyor 3. The horizontal transfer can be achieved by different means, like at least one pusher, a moving belt, etc. If necessary, the transfer of another layer 2 can then start again, or the process is simply terminated.

It should be noted that in case of problem during the execution of the depalletisation process, an operator might have to enter the production zone and solve the problem. This problem can lead, for example, to removing products remaining on the tray 7, or hanging under the lifted layer 2, or even removing a complete layer of the stack 5, etc. Therefore, when the process is restarted, it is necessary at least to measure again the height of the stack 5, because the operator might have changed it. A possible us of the object detector 8 to measure the height of the stack 5 has already been described and can be executed here again: the object detector 8 is lifted along the stack 5 until no detection is triggered and then lowered down until detection is triggered again.

It should also be noted that a single object detector 8 can be used for each above mentioned detection: detecting the first bottom layer of the full pallet 4, detecting the height of the stack 5, detecting the horizontal position of the layer 2, detecting if something is hanging under the lifted layer, and detecting that the top surface of the tray 7 is not empty. The object detector 8 has to be moved up and down or at least positioned at the correct height, and a precise tracking of its vertical position is therefore achieved. Preferably, the object detector 8 is directly linked to the tray 7 and benefit from its own vertical movement. Therefore, no additional vertical actuator is necessary to move the object detector 8. For some detection, the object detector 8 has to be able to detect products in the pallet zone 9, i.e. above the pallet 4. For other detections, the object detector 8 has to be able to detect products in the tray zone 10, i.e. approximately in the zone in which the tray 7 has its vertical movement.

Figure 3:
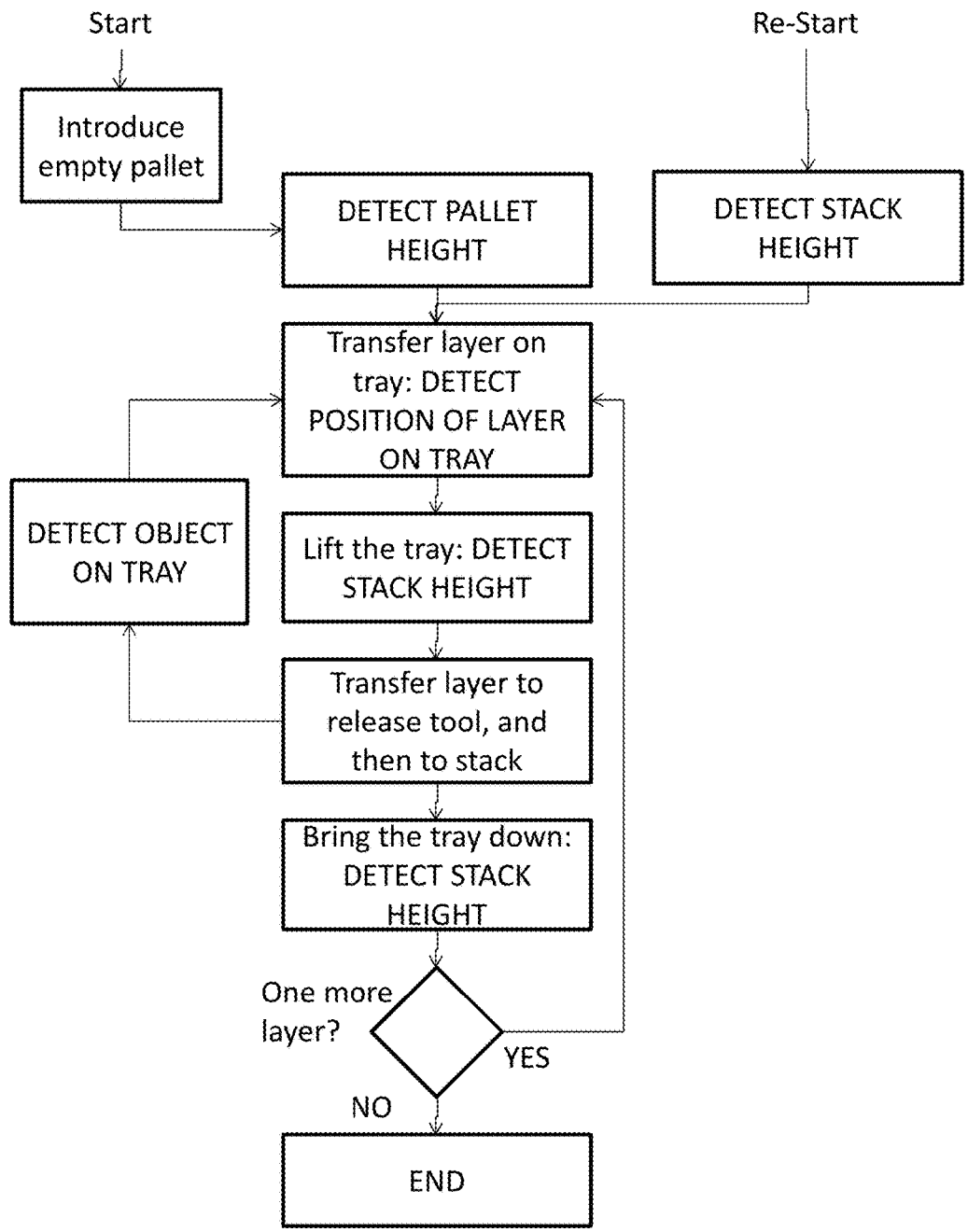
FIG. 3 shows some steps of a palletisation process.

The transfer device can also work in a palletisation process. In such a process, the layers 2 are received from the external conveyor 3, transferred to the tray 7, then transferred to the release tool 12, and then finally transferred to the pallet 4 or stack 5. Some steps of this palletisation process will now be described with reference to FIG. 3 in order to show the use of the specific object detector 8 in this process.

The first step of a palletisation process is to introduce an empty pallet 4 in the pallet zone 9 on which the layers 2 will be put one on the top of the other. The layers 2 will be successively brought on the pallet 4 to create a stack 5. Once the empty pallet 4 has arrived in the expected position, it is necessary to measure its real thickness, in order to release the layers 2 at the correct vertical location. As explained earlier for measuring the height of the stack 5 to depalletize, this kind of measurement can be achieved by moving the object detector 8 up and down, and conclude about the height based on, first, the signal obtained, and, second, the corresponding vertical position of the object detector 8.

A layer 2 of products is then transferred from the external conveyor 3 to the tray 7. This transfer is achieved by an actuator, for example at least one pusher or also a moving belt on which the layer 2 stands, etc. The action of this actuator is preferably controlled based on the position of the layer 2, as measured by the object detector 8. This actuator acts until the layer 2 arrives at the expected position on the tray 7. The position of the layer 2 on the tray 7 is checked by the object detector 8 and the actuator is controlled accordingly. The object detector 8 should then be able to detect objects and also to detect their distance. Here again, the object detector 8 can be directly linked to the tray 7, and oriented so as to be able to detect products on the top surface of the tray 7. As the external conveyor 3 is fixed, there is no need to provide a vertical movement of the object detector 3 during this phase. The object detector 8 might have to be moved before or after.

After the layer 2 has been transferred to the tray 7, it is to be transferred to pallet 4 or stack 5. The tray 7 is then lifted at the height of the release tool 12. The layer 2 is then transferred to the release tool 12. The release tool 12 releases the layer 2 on the pallet 4 or stack 5, while the tray 7 goes down to the level of the external conveyor 3 to receive the next layer 2. It is necessary to check that the height of the stack 5 progresses as expected, after each layer 2 transfer on the top of it. As already described, a vertical movement of the object detector 8 can then be organized in order to detect at which vertical position no product is detected anymore. This can also be adapted here. It is even possible to have the object detector 8 fixed to the tray 7. The vertical movements of tray 7, up and down for the transfer purposes, can therefore be used as described above to measure the height of the stack 5. Such a detection of the height of the stack 5 can also be done when the process is restarted and when it is then necessary to check again the real height of the stack 5, as an operator might have removed or added a layer 2 on his/her own.

It is also important to check that the top surface of the tray 7 is empty before transferring on it a layer 2 from the external conveyor 3. This can be achieved at any time between the transfer of the layer 2 to the release tool 12 and the transfer of a new layer 2 to the tray 7. This can for example be achieved while the tray 7 is moving down, especially if the object detector 8 is directly fixed on the tray 7 and able to scan the top surface thereof.

Preferably, all the detection steps are performed by the same single object detector 8, even if the transfer device 1 has more than one guiding column 6, and its vertical position is directly the position of the tray 7, the object detector 8 being directly mounted or at least linked to said tray 7.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof, including any combination of their features.

The invention claimed is:

1. A transfer device (1) for transferring pre-formed layers (2) of products between a conveyor (3) and a pallet (4) on which the layers (2) form a stack (5) of the layers (2), said transfer device (1) comprising:
    a support structure comprising at least one vertical guide column (6),
    a tray (7), mounted on the support structure and receiving the pre-formed layer (2), the tray (7) movable vertically along the support structure between a lower position and an upper position corresponding to a vertical level of a completed stack (5) of the layers (2),
    a tool, mounted on the support structure and being movable in a horizontal direction, the tool for transferring a layer (2) between the tray (7) and the pallet (4) or the stack (5), and
    an object detector (8) with a wide detection angle, the object detector (8) positioned to detect products at a same vertical level in a wide horizontal field of observation, said object detector being movable in the vertical direction along the support structure,
    wherein a width of a detection zone (13) of the object detector extends in a transversal direction from a tray zone to a pallet zone, the width of the detection zone (13) being sufficiently wide to detect the products at the same vertical level located in both the tray zone and the pallet zone, the tray zone being a volume occupied by horizontal dimensions of the tray and vertical movement of the tray between the lower position and the upper position, and the pallet zone being a volume occupied by at least the pallet (4) and the completed stack (5) of the layers (2).

2. The transfer device according to claim 1, wherein the object detector (8) is a laser based surface detector.

3. The transfer device (1) according to claim 1, wherein the object detector (8) is fixed to the tray (7) itself, and oriented so as to be able to detect objects on a top surface of the tray (7).

4. The transfer device (1) according to claim 1, wherein the support structure comprises only one guide column (6), the tray (7) is mounted on said column (6) and defines the tray zone (10), the tool is also mounted on said column (6) with a cantilever beam, defining the pallet zone (9) under its free end, and the object detector (8) is mounted at an interface between the tray zone (10) and the pallet zone (9).

5. The transfer device of claim 1, wherein the object detector (8) is oriented so as to be able to detect objects on a top surface of the tray (7).

6. The transfer device (1) according to claim 1, wherein the detector (8) is fixed to the tray (7) itself.

7. A transfer method for transferring pre-formed layers (2) of products between an external conveyor (3) and a pallet (4) on which layers can be put one above the other to form a stack (5), said method comprising transferring a layer (2) between a tray (7) and the stack (5) or pallet (4) and transferring a layer (2) between the tray (7) and an external conveyor (3), said transfer method comprising:
  detecting objects with an object detector (8), and moving said object detector (8) in a vertical direction; and
  detecting an object hanging under the layer (2) gripped and lifted for the transfer, before said layer (2) is released on the tray (7), said detection mainly consisting in vertically positioning an object detector (8) at the level of the height of the top layer (2) on the stack (5) before the object is lifted, said object detector (8) being positioned to detect products in the pallet zone (9).

8. The transfer method according to claim 7, comprising detecting the height of the stack (5) by moving the object detector (8) in the vertical direction along the stack (5).

9. The transfer method according to claim 7, further comprising detecting the presence of a new full pallet (4) and stack (5) to be treated by depalletization by vertically positioning the object detector (8) at the expected height of the bottom layer (2) of a stack (5).

10. The transfer method according to claim 7, further comprising detecting the exact horizontal position of the layer (2) to be gripped and transferred to the tray (7) by vertically positioning the object detector (8) at the height of said layer (2).

11. The transfer method according to claim 7, further comprising detecting that the tray (7) is empty after the transfer of the layer (2) from the tray (7), to either the external conveyor (3) or the tool by vertically positioning the object detector (8) at the height of the receiving surface of the tray (7).

12. The transfer method according to claim 7, comprising detecting the thickness of an empty pallet (4) before layers (2) are stacked on the empty pallet (4) by vertically moving the object detector (8) oriented in the direction of the pallet (4).

13. The transfer method according to claim 7, wherein the detections are achieved with the same object detector (8).

14. The transfer method according to claim 7, wherein the vertical movement of the object detector (8) needed for the detection or detections is achieved by moving the tray (7) in the vertical direction, said detector (8) being fixed to said tray (7).

15. A transfer device (1) for transferring pre-formed layers (2) of products between a conveyor (3) and a pallet (4) on which the layers (2) form a stack (5) of the layers (2), said transfer device (1) comprising:
  a support structure comprising at least one vertical guide column (6);
  a tray (7), mounted on the support structure and receiving the pre-formed layer (2), the tray (7) movable vertically along the support structure through a tray zone between a lower position and an upper position;
  a tool, mounted on the support structure and being movable in a horizontal direction, the tool for lifting a layer (2) from the pallet (4) or the stack (5) and transferring the lifted layer (2) to the tray (7); and
  an object detector (8) with a wide detection angle, the object detector positioned to detect products at a same vertical level in a wide horizontal field of observation, said object detector being movable in the vertical direction along the support structure, a width of a detection zone (13) of the object detector (8) extending from the tray zone to the pallet zone, the width of the detection zone (13) being sufficiently wide to detect the products at the same vertical level located in both the tray zone and the pallet zone,
  wherein the detection zone further extends below the lifted layer allowing detection of an object hanging under the lifted layer (2), before the lifted layer (2) is released on the tray (7), a lower portion of said detection zone including a level of a height of a top layer (2) on the stack (5) before the lifted layer (2) is lifted.

16. the transfer device according to claim 15, wherein,
  the upper position of the tray (7) corresponds to a vertical level of a completed stack (5) of the layers (2), and
  wherein the tray zone is a volume occupied by horizontal dimensions of the tray and vertical movement of the tray between the lower position and the upper position, and the pallet zone is a volume occupied by at least the pallet (4) and the completed stack (5) of the layers (2).

17. The transfer device according to claim 15, wherein the object detector (8) is a laser based surface detector.

18. The transfer device (1) according to claim 15, wherein the object detector (8) is fixed to the tray (7) itself, and oriented so as to be able to detect objects on a top surface of the tray (7).

19. The transfer device (1) according to claim 15, wherein the support structure comprises only one guide column (6), the tray (7) is mounted on said column (6) and defines the tray zone (10), the tool is also mounted on said column (6) with a cantilever beam, defining the pallet zone (9) under its free end, and the object detector (8) is mounted at an interface between the tray zone (10) and the pallet zone (9).

20. The transfer device of claim 15, wherein the object detector (8) is oriented so that the detection zone of the object detector is sufficient to detect objects on a top surface of the tray (7).

* * * * *